US012308406B2

(12) United States Patent
Lee et al.

(10) Patent No.: US 12,308,406 B2
(45) Date of Patent: *May 20, 2025

(54) BATTERY MODULE HAVING A SENSING MODULE THEREON

(71) Applicant: SK On Co., Ltd., Seoul (KR)

(72) Inventors: Seung Hun Lee, Daejeon (KR); Yun Joo Noh, Daejeon (KR); Tae Gu Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,108

(22) Filed: Nov. 2, 2023

(65) Prior Publication Data

US 2024/0063461 A1 Feb. 22, 2024

Related U.S. Application Data

(63) Continuation of application No. 16/785,165, filed on Feb. 7, 2020, now Pat. No. 11,848,432.

(30) Foreign Application Priority Data

Feb. 8, 2019 (KR) ........................ 10-2019-0014975

(51) Int. Cl.
*H01M 10/65* (2014.01)
*H01M 10/42* (2006.01)
(Continued)

(52) U.S. Cl.
CPC ....... *H01M 10/653* (2015.04); *H01M 10/425* (2013.01); *H01M 10/48* (2013.01);
(Continued)

(58) Field of Classification Search
CPC ........... H01M 10/653; H01M 10/6551; H01M 10/425; H01M 10/48; H01M 10/486;
(Continued)

(56) References Cited

U.S. PATENT DOCUMENTS

| 11,848,432 | B2 * | 12/2023 | Lee ..................... H01M 10/425 |
| 2019/0296316 | A1 * | 9/2019 | Wang .................... H01M 50/54 |
| 2020/0067061 | A1 * | 2/2020 | Wynn ................. H01M 50/503 |

FOREIGN PATENT DOCUMENTS

| KR | 10-2018-0020546 A | 2/2018 |
| KR | 20180022445 A | 3/2018 |

OTHER PUBLICATIONS

Office Action for the Korean Patent Application No. 10-2019-0014975 issued by the Korean Intellectual Property Office on Jan. 24, 2024.

(Continued)

*Primary Examiner* — Raymond Alejandro
(74) *Attorney, Agent, or Firm* — IP & T GROUP LLP

(57) ABSTRACT

A battery module which includes: a battery stack formed by stacking a plurality of battery cells respectively including electrode tabs on each other; bus bar assemblies located on both sides of the battery stack, from which the electrode tabs are drawn, to electrically connect the plurality of battery cells to each other through the plurality of electrode tabs; and a sensing module assembly disposed on one side of the battery stack, from which the electrode tab is not drawn out, to electrically connect the bus bar assemblies on both sides of the battery stack.

16 Claims, 7 Drawing Sheets

(51) Int. Cl.
  *H01M 10/48* (2006.01)
  *H01M 10/653* (2014.01)
  *H01M 10/6551* (2014.01)
  *H01M 50/211* (2021.01)
  *H01M 50/289* (2021.01)
  *H01M 50/50* (2021.01)
  *H01M 50/507* (2021.01)
  *H01M 50/548* (2021.01)
  *H01M 50/569* (2021.01)
  *H01M 50/271* (2021.01)

(52) U.S. Cl.
  CPC ..... *H01M 10/486* (2013.01); *H01M 10/6551* (2015.04); *H01M 50/211* (2021.01); *H01M 50/289* (2021.01); *H01M 50/50* (2021.01); *H01M 50/507* (2021.01); *H01M 50/548* (2021.01); *H01M 50/569* (2021.01); *H01M 2010/4271* (2013.01); *H01M 50/271* (2021.01)

(58) Field of Classification Search
  CPC ............... H01M 50/50; H01M 50/548; H01M 50/289; H01M 50/569; H01M 50/211; H01M 50/507; H01M 50/271; H01M 2010/4271
  See application file for complete search history.

(56) References Cited

OTHER PUBLICATIONS

Office Action for Korean Patent Application No. 10-2019-0014975 issued by the Korean Patent Office on Sep. 24, 2024.

* cited by examiner

BATTERY MODULE HAVING A SENSING MODULE THEREON

CROSS-REFERENCE TO RELATED APPLICATION

This application is a continuation of U.S. patent application Ser. No. 16/785,165, filed on Feb. 7, 2020, patented as U.S. Pat. No. 11,848,432, issued Dec. 19, 2023, which claims priority to Korean Patent Applications No. 10-2019-0014975, filed on Feb. 8, 2019, the entire disclosure of which is incorporated by reference herein.

BACKGROUND OF THE INVENTION

1. Field of the Invention

One embodiment of the invention relates to a battery module.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

As described above, when the plurality of secondary batteries are connected with each other in series to be used in a high-output hybrid vehicle or an electric vehicle, the plurality of secondary batteries are fixed using a member such as a cover or a case, then a plurality of battery cells are electrically connected with each other using a connection member such as a bus bar. Therefore, the plurality of secondary batteries may be used as one battery module form.

However, in the conventional battery module, after stacking a plurality of secondary batteries, the respective bus bars come into contact with electrode tabs to be connected by a process such as welding, or bus bar assemblies including a plurality of bus bars are assembled in advance, then are connected in contact with the electrode tab side. Thereafter, a sensing module assembly for sensing state information such as a temperature and a voltage of the battery cells is fastened to the bus bar assemblies in a separate process.

Therefore, providing assembly time and manpower is required for assembling the above-mentioned parts, and jigs are additionally required for assembling the parts in position when assembling the respective parts. Furthermore, since the sensing module assembly is formed of a rigid body, there is a problem that a weight and a volume of the entire battery module are increased, thereby resulting in a somewhat reduce in energy efficiency per unit weight or per unit volume. In addition, in a case of the conventional sensing module assembly, since the battery bars are simply fastened to the bus bar assembly on an upper side of the battery stack, there is a problem that a heat dissipation performance of the battery cells through the sensing module assembly is deteriorated.

PRIOR ART DOCUMENT

Patent Document (Patent Document 1) Korean Patent Laid-Open Publication No. 10-2015-0110078 (published on Oct. 2, 2015)

SUMMARY OF THE INVENTION

It is an object of embodiments of the present invention to provide a battery module which is capable of minimizing a volume and improving energy efficiency per unit volume.

Further, another object of the embodiments of the present invention is to provide a battery module in which a battery stack may be supported downward through a sensing module assembly, thereby increasing cooling efficiency.

Further, another object of the embodiments of the present invention is to provide a battery module in which fixability of a battery stack housed in a case unit may be enhanced.

Further, another object of the embodiments of the present invention is to provide a battery module which may increase a heat dissipation effect through a sensing module assembly of a battery stack.

Further, another object of the embodiments of the present invention is to provide a battery module which is capable of achieving weight lighting and reducing manufacturing costs.

Furthermore, another object of the embodiments of the present invention is to provide a battery module that may block the possibility of electrical communication between a battery stack and an upper cover.

To achieve the above objects, according to an aspect of the present invention, there is provided a battery module including: a battery stack formed by stacking a plurality of battery cells respectively including electrode tabs on each other; bus bar assemblies located on both sides of the battery stack, from which the electrode tabs are drawn, to electrically connect the plurality of battery cells to each other through the plurality of electrode tabs; and a sensing module assembly disposed on one side of the battery stack, from which the electrode tab is not drawn out, to electrically connect the bus bar assemblies on both sides of the battery stack.

The sensing module assembly may be formed in a plate or frame form.

The sensing module assembly may be formed in a film shape having a predetermined thickness.

The sensing module assembly may be formed in a thickness of 0.5 mm or less.

The sensing module assembly may be made of an elastic flexible material.

The sensing module assembly may be made of an insulation material.

The sensing module assembly may be made of a material having a melting point of 90° C. or higher.

The sensing module assembly may include at least one protrusion which protrudes toward the battery stack so to support one side of the battery stack, from which the electrode tab is not drawn out.

The battery module may further include a surface pressure pad disposed between the battery stack and the sensing module assembly to support the battery stack downward by the sensing module assembly.

A thermal conductive member may be filled between the battery stack and the sensing module assembly.

The sensing module assembly may have at least one heat dissipation hole formed therein.

The bus bar assemblies and the sensing module assembly may be integrally formed with each other.

According to embodiments of the present invention, it is possible to minimize the volume and improve the energy efficiency per unit volume.

In addition, according to embodiments of the present invention, since the battery stack is supported downward through the sensing module assembly, cooling efficiency may be increased.

Further, according to embodiments of the present invention, the fixability of the battery stack housed in the case unit may be enhanced.

Further, according to embodiments of the present invention, the heat dissipation effect through the sensing module assembly of the battery stack may be increased.

Further, according to embodiments of the present invention, it is possible to achieve weight lighting and reduce manufacturing costs.

Further, according to embodiments of the present invention, it is possible to block the possibility of electrical communication between the battery stack and the upper cover.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
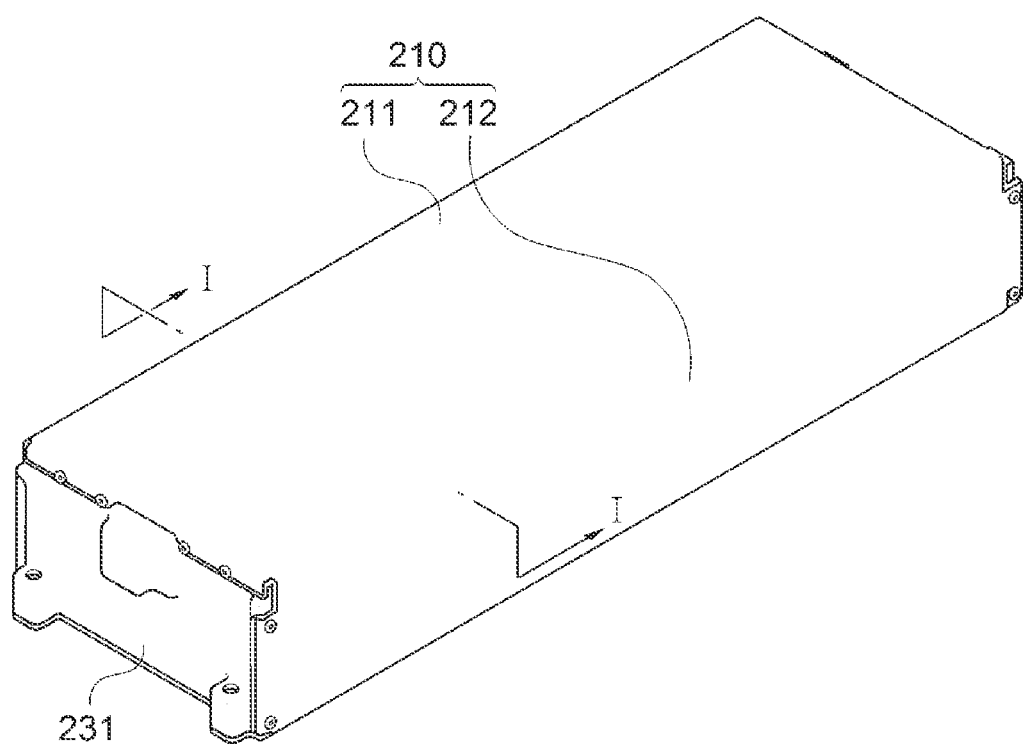
FIG. 1 is a perspective view illustrating a battery module according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Figure 2:
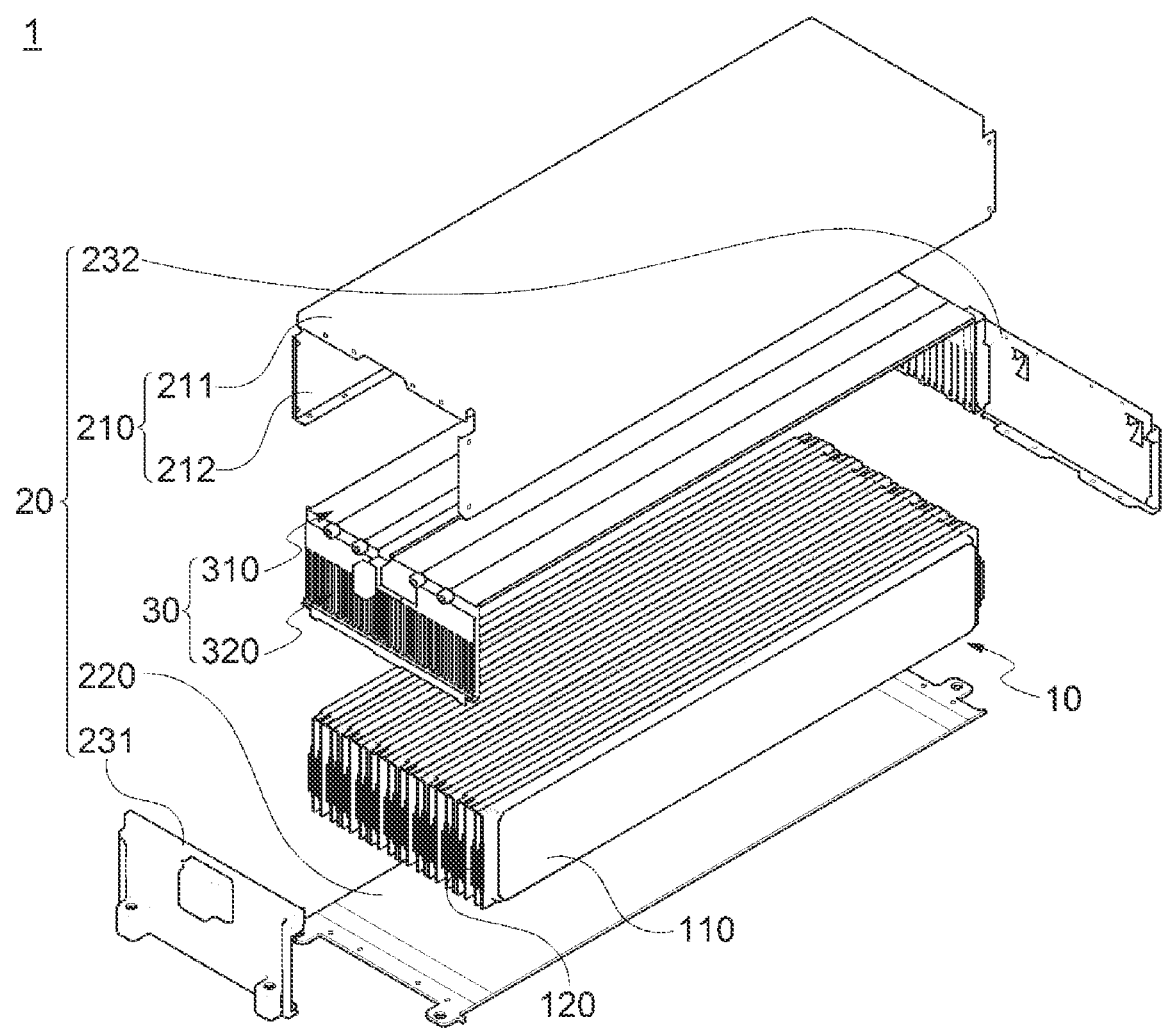
FIG. 2 is an exploded perspective view of the battery module according to the embodiment of the present invention.

FIG. 1 is a perspective view illustrating a battery module 1 according to an embodiment of the present invention, and FIG. 2 is an exploded perspective view of the battery module 1 according to the embodiment of the present invention.

Referring to FIGS. 1 and 2, the battery module 1 according to the embodiment of the present invention may include: a battery stack 10 formed by stacking a plurality of battery cells 110; bus bar assemblies 320 located on one side or both sides of the battery stack 10; and a sensing module assembly 310 disposed on one side of the battery stack 10, from which the electrode tab 120 is not drawn out, to electrically connect the bus bar assemblies 320 on both sides of the battery stack 10.

In this case, each of the plurality of battery cells 110 may include electrode tabs 120 drawn from both sides thereof. In addition, the bus bar assembly 320 may be located on both sides of the battery stack 10, from which the electrode tabs 120 are drawn out, to electrically connect the plurality of battery cells 110 to each other through the plurality of electrode tabs 120.

Meanwhile, the above-described sensing module assembly 310 may be disposed on one side of the battery stack 10 in a direction in which the battery cells ('stacking direction of the battery cells') and a direction perpendicular to a direction in which the electrode tabs 120 are drawn out, and may be disposed on an upper side of the battery stack 10 in the drawings.

That is, one side of the battery stack 10, from which the electrode tabs 120 are not drawn out, may be one side of outer six surfaces of the battery stack 10, which is perpendicular to each of the stacking direction of the battery stack 10 and the direction in which the electrode tabs 120 are drawn out.

The above-described battery stack 10 and the bus bar assembly 320 may be housed in a case unit 20 with being fastened to each other. In addition, the above-described plurality of battery cells 110 of the battery stack 10 may be erected so that one side of all the plurality of battery cells 110 can be located on a lower side or an upper side with being stacked on each other. That is, the stacking direction of the battery cells 110 may be parallel to a surface of the ground.

Herein, the above-described case unit 20 may include a cooling plate 220 disposed on the lower side of the battery cells 110 parallel to the stacking direction of the battery cells 110, and the cooling plate 220 may be disposed in contact with one side (a lower surface in the drawings) of all the above-described plurality of battery cells 110.

Meanwhile, the battery module 1 according to the embodiment of the present invention may further include an upper cover 211 disposed on a side opposite to the cooling plate 220 (i.e., the upper side of the battery stack 10) with respect to the battery stack 10.

In this case, the upper cover 211 may be integrally formed with the above-described pair of side covers 212, and the integrally formed upper cover 211 and the pair of side covers 212 may form an upper case 210.

In addition, the case unit 20 may further include a front cover 231 disposed on one side of the battery stack 10 in the direction in which the electrode tabs 120 are drawn out, and a rear cover 232 disposed on the other side. In this case, the above-described bus bar assembly 320 may be located between each of the front and rear covers 231 and 232 and the battery stack 10.

Meanwhile, the upper case 210, the cooling plate 220, the front cover 231, and the rear cover 232 may be located so as to surround the outer six surfaces of the battery stack 10, and may be fastened to each other, so as to form the case unit 20 in which the battery stack 10 is housed. In addition, it is possible to protect the plurality of battery cells 110 from an external shock or foreign matters by the case unit 20.

Meanwhile, a plurality of bus bar holes 3221 may be formed in the above-described bus bar assembly 320, and the bus bar assembly 320 may be disposed in contact with the plurality of electrode tabs 120. In addition, the plurality of electrode tabs 120 may be connected to the bus bar assembly 320 through the plurality of bus bar holes 3221.

The above-described electrode tab 120 and the bus bar hole 3221 may be connected to each other by laser welding, but this is merely an example, and it is not limited thereto.

Furthermore, the above-described sensing module assembly 310 may be disposed between an upper surface of the battery stack 10 and the above-described upper cover 211 on the upper side of the battery stack 10. At this time, a surface pressure pad (illustrated in FIG. 6) having an elastic repulsive force may be provided on a contact surface with the battery stack 10. Details of a surface pressure pad 330 will be described below.

Figure 3:
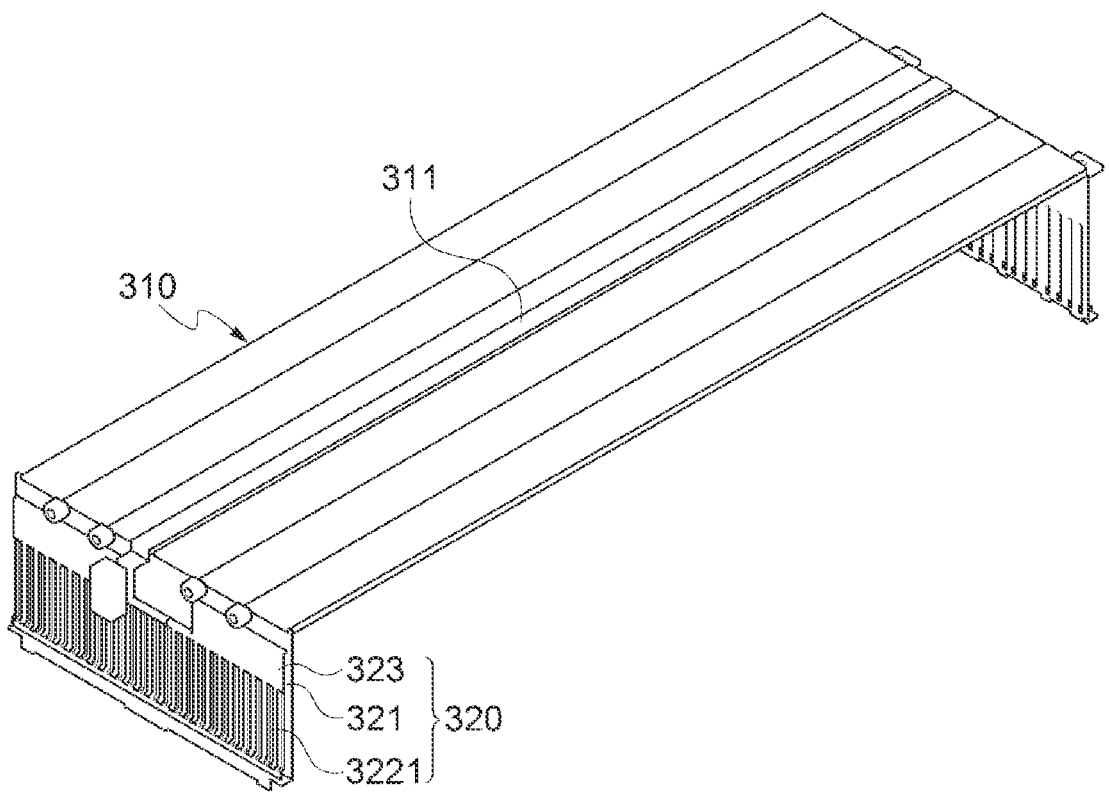
FIG. 3 is a perspective view illustrating an upper structure of the battery module according to the embodiment of the present invention.
Figure 4:
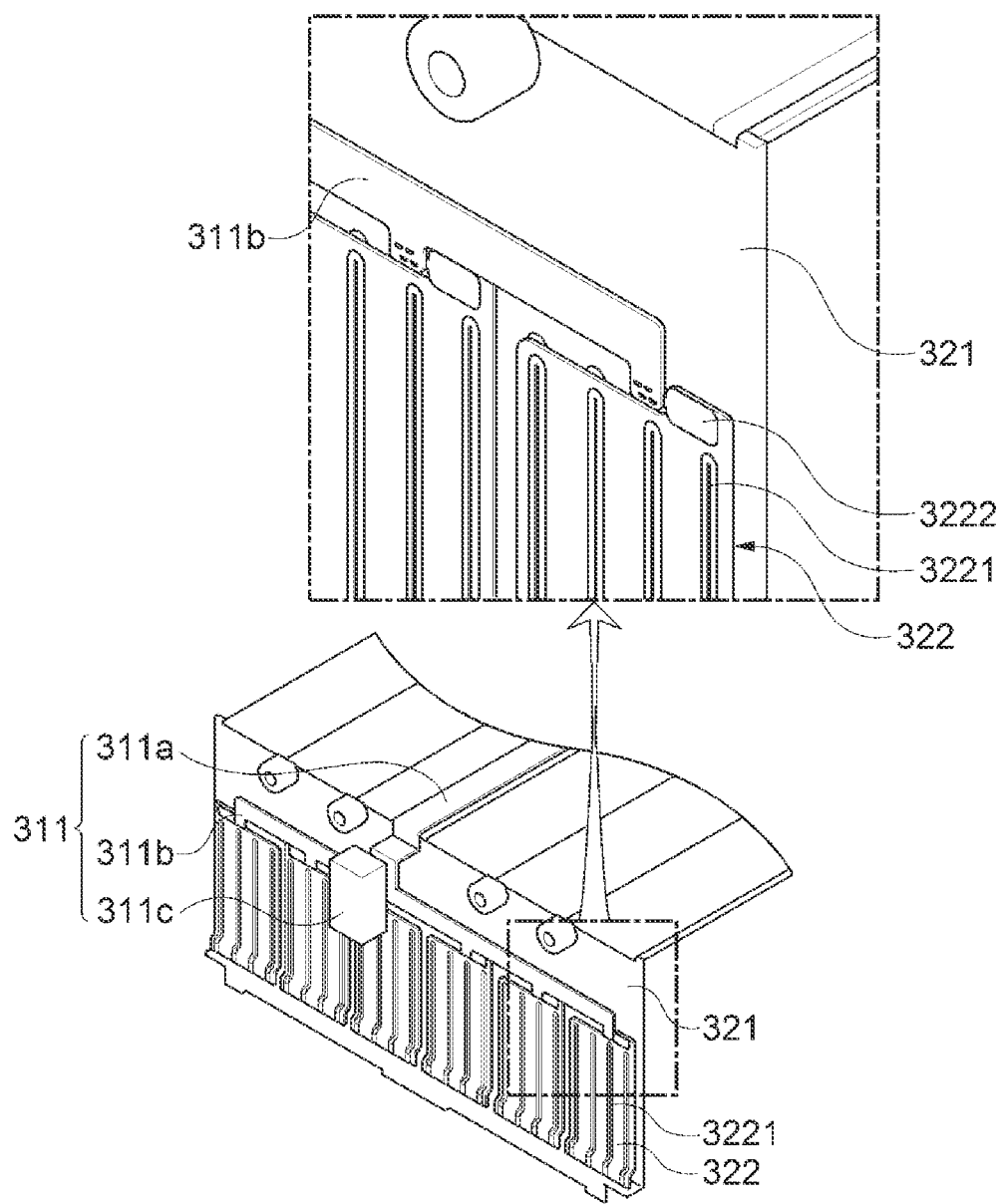
FIG. 4 is a perspective view illustrating a connection relationship between a bus bar assembly and a sensing module assembly in the battery module according to the embodiment of the present invention.

FIG. 3 is a perspective view illustrating an upper structure 30 of the battery module 1 according to the embodiment of the present invention, and FIG. 4 is a perspective view illustrating a connection relationship between the bus bar assembly 320 and the sensing module assembly 310 in the battery module 1 according to the embodiment of the present invention. More specifically, FIG. 4 is a view illustrating arrangement and connection states of the bus bar 322 located on the bus bar support 321 by removing the bus bar cover 323 from the upper structure 30 in FIG. 3.

Referring to FIGS. 3 and 4, the bus bar assemblies 320 and the sensing module assembly 310 of the battery module 1 according to the embodiment of the present invention may be integrally formed, and the integrally formed bus bar assemblies 320 and the sensing module assembly 310 may form the upper structure 30.

At this time, the bus bar assemblies 320 may be fitted to both sides of the upper structure 30 in the direction in which the electrode tabs 120 are drawn out, and the sensing module assembly 310 and the bus bar assemblies 320 may be disposed on the battery stack 10 and connected with being integrally formed with each other. However, this is merely an example, and it is not limited thereto, and the battery assemblies and the sensing module assembly 310 may be separately prepared and then coupled to each other by screwing or thermal fusing.

Meanwhile, the bus bar assembly 320 may include: one or more bus bars 322 having the above-described plurality of bus bar holes 3221 formed therein; a bus bar support 321 configured to fix and support the one or more bus bars 322 arranged at positions spaced apart from each other; and a bus bar cover 323 configured to surround outsides of the one or more bus bars 322.

In this case, the above-described bus bar support 321 may be located between one or more bus bars 322 and the battery stack 10. Herein, the bus bar cover 323 may be fastened to the bus bar support 321 so as to surround outer surfaces of the one or more bus bars 322 in a state in which the one or more bus bars 322 are disposed on the bus bar support 321.

Meanwhile, the bus bar support 321 and the bus bar cover 323 may be formed in a frame shape, and the bus bar holes 3221 provided in the bus bar 322 may be formed to be exposed to both sides in the direction in which the electrode tabs 120 are drawn out. In this case, each of the plurality of electrode tabs 120 may be inserted into each of the plurality of bus bar holes 3221, and the electrode tab 120 and the bus bar hole 3221 may be connected to each other by laser welding or the like.

In addition, the upper structure 30 may include a connector 311 for electrically connecting the bus bar assemblies 320 on both sides of the above-described battery stack 10.

Specifically, the connector 311 may include: a first connection member 311a disposed on the sensing module assembly 310 in the direction in which the electrode tabs 120 are drawn out, a second connection member 311b connected to one end of the first connection member 311a and disposed on one bar assembly of the pair of bus bar assemblies 320; and a third connection member (not illustrated) connected to the other end of the first connection member 311a and disposed on the remaining bar assembly 320.

In this case, the first connection member 311a, the second connection member 311b, and the third connection member may be formed of a wire or a flexible circuit board (FPC) for transmitting and receiving electrical signals, and voltage and temperature sensing signals measured from the pair of bus bar assemblies 320 may be transmitted to a control circuit (not illustrated) and the like. Meanwhile, the above-described control circuit may include components, which are capable of measuring and determining voltage or temperature states in the plurality of battery cells 110, such as a sensing circuit, a battery management module, and the like located outside the battery module 1 according to the embodiment of the present invention.

More specifically, sensing connection parts 3222 may be formed on one side of each of the plurality of bus bars 322. In this case, each of the above-described second connection member 311b and the third connection member may be connected to the sensing connection parts 3222 formed on one or more bus bars 322 disposed on each of the pair of bus bar assemblies 320. That is, as illustrated in FIG. 4, the second connection member 311b may be electrically connected to each of the plurality of bus bars 322 of the bus bar assembly 320 on which the second connection member 311b is located through the sensing connection part 3222.

In addition, the measured voltage or temperature sensing signals may be transmitted to an external connection member 311c formed on at least a portion of the first connection member 311a and the second connection member 311b and connected to the control circuit through the second connection member 311b and the third connection member. That is, the voltage or temperature sensing signals measured from the bus bar assemblies 320 may be transmitted to the control circuit through the external connection member 311c.

Meanwhile, when the bus bar cover 323 is mounted on the bus bar support 321, the second connection member 311b and the third connection member may be covered by the bus bar cover 323, and thereby the second connection member 311b and the third connection member may not be exposed to an outside.

Meanwhile, the above-described sensing module assembly 310 may be formed in a plate or frame shape, and preferably is formed of a thin plate film, so as to cover at least a portion of the upper surface of the battery stack 10.

Thereby, it is possible to minimize a volume of the battery module 1 according to the embodiment of the present invention and improve energy efficiency per unit volume.

Further, more preferably, thicknesses of the sensing module assembly 310 in the direction in which the electrode tabs 120 are drawn out and a direction perpendicular to the stacking direction of the battery cells 110 are formed to be 0.5 mm or less. That is, the sensing module assembly 310 may be formed in a form of a film having a thickness of 0.5 mm or less, and thereby a weight and a volume of the sensing module assembly 310 may be decreased and manufacturing costs may be reduced.

In addition, the sensing module assembly 310 may be made of an elastic flexible material. As the sensing module assembly 310 is made of a flexible material, the sensing module assembly 310 integrally coupled with the bus bar assembly 320 may be bent at a predetermined angle based on the direction in which the electrode tabs 120 are drawn out.

When a central portion of the sensing module assembly 310 is bent downward to the battery stack 10 side, the bus bar assemblies 320 formed on both sides of the sensing module assembly 310 may be spaced apart from each other, and the sensing module assembly 310 is placed on the upper side of the battery stack 10 with being bent, such that the bus bar assembly 320 may also be easily placed on the plurality of electrode tabs 120 of the battery stack 10. That is, since the sensing module assembly 310 is flexibly formed to be elastically bent, the bus bar assembly 320 may be rotated by a predetermined angle with respect to the direction in which the electrode tabs 120 are drawn out, and an interference between the bus bar assembly 320 and the electrode tabs 120 during a contact of the bus bar hole 3221 with the electrode tab 120 may be avoided.

Furthermore, the sensing module assembly 310 may be made of an insulation material. In detail, the sensing module assembly 310 may be made of a material having insulation property such as plastic. Since the sensing module assembly 310 has insulation property, it is possible to block the possibility of electrical communication between the upper cover 211 and the battery stack 10.

In addition, the sensing module assembly 310 may be made of a material having a heat resistance property, of which melting point is 90° C. or higher. Since the sensing module assembly 310 is made of a material having a melting point of 90° C. or higher, even when the plurality of battery cells 110 generate heat, the shape and structure of the battery stack may be maintained, and the possibility of electrical communication between the battery stack 10 and the upper cover 211 may be blocked.

Meanwhile, as described above, the sensing module assembly 310 may be made of a material having insulation and heat resistance properties, and preferably, is made of any one material selected from polycarbonate, polypropylene, and polyethylene. However, this is merely an example, and it is not limited thereto, and any material may be used so long as it has both insulation and heat resistance properties.

Figure 5:
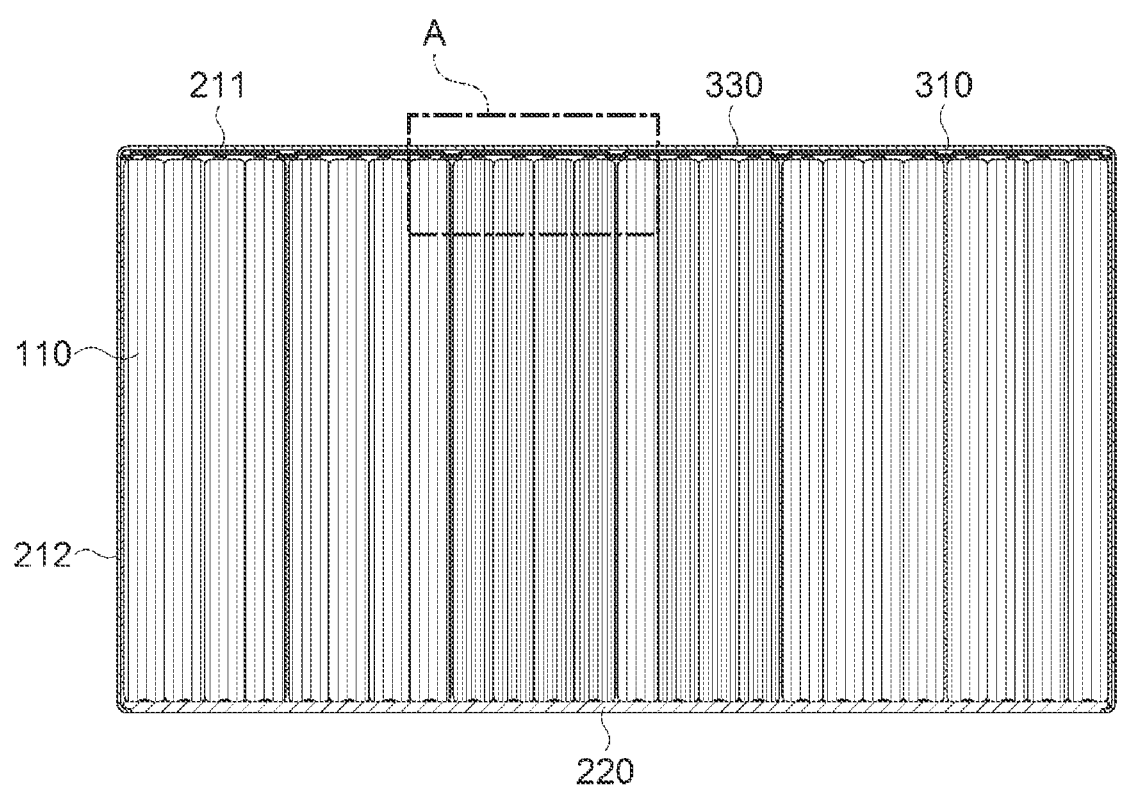
FIG. 5 is a cross-sectional view taken on line I-I in FIG. 1.
Figure 6:
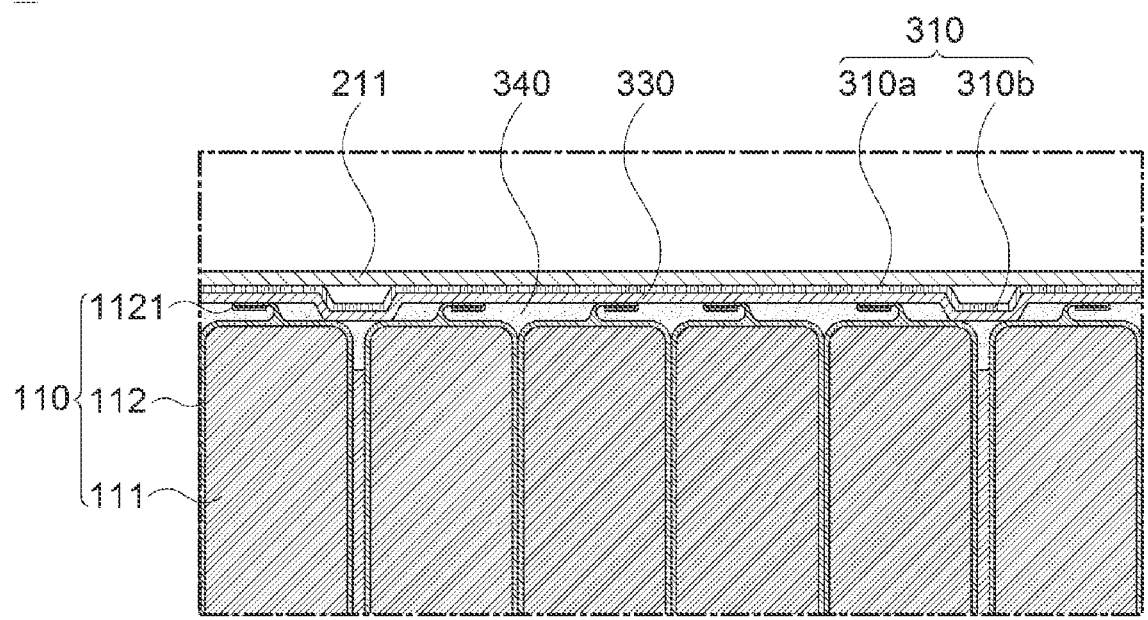
FIG. 6 is an enlarged view of a portion A in FIG. 5.

FIG. 5 is a cross-sectional view taken on line I-I in FIG. 1, and FIG. 6 is an enlarged view of a portion A in FIG. 5.

Referring to FIGS. 5 and 6, the sensing module assembly 310 of the battery module 1 according to the embodiment of the present invention may include at least one protrusion 310*b* which protrudes toward the battery stack 10 so as to support one side of the battery stack 10 parallel to the stacking direction of battery cells 110. In addition, the sensing module assembly 310 may further include the surface pressure pad 330 disposed between the battery stack 10 and the same to support the battery stack 10 downward by the support of the sensing module assembly 310.

In detail, the sensing module assembly 310 may include: at least one planar portion 310*a* formed in parallel to the above-described cooling plate 220; and at least one protrusion 310*b* formed by bending a portion of the sensing module assembly 310 in a predetermined depth toward the battery stack 10 in the direction in which the electrode tabs 120 are drawn out. In this case, the protrusion 310*b* may protrude toward the battery stack 10 based on the planar portion 310*a*.

Meanwhile, the at least one protrusion 310*b* may press and support the battery stack 10 when the sensing module assembly 310 is placed on the upper side of the battery stack 10. More preferably, the at least one protrusion 310*b* support the battery stack 10 downward through the surface pressure pad 330 to be described below.

In this case, the above-described protrusion 310*b* may directly press the portions of the battery cells 110 in the electrode assembly 111. That is, a sealing part 1121, which is disposed between the electrode assembly 111 and the sensing module assembly 310 among the sealing parts 1121 formed by fusing an exterior packaging material 112 surrounding the electrode assembly 111 in the battery cell 110 outside of the electrode assembly 111, may be located at a height between a lower end in the protruding direction of the protrusion 310*b* with respect to the cooling plate 220 and the planar portion 310*a*, and may be located with being bent toward the electrode assembly 111 by the support of the planar portion 310*a* and the surface pressure pad 330. As described above, since the protrusion 310*b* directly presses the electrode assembly 111, a position of the battery stack 10 housed in the case unit 20 may be easily fixed.

Meanwhile, the above-described surface pressure pad 330 may be made of an insulation material having an elastic repulsive force. In addition, the surface pressure pad 330 may be formed in a size corresponding to that of the sensing module assembly 310 with respect to the battery stack 10, and may be interposed between the upper surface of the battery stack 10 and the sensing module assembly 310.

At this time, the above-described surface pressure pad 330 may press the battery stack 10 downward when the sensing module assembly 310 is connected to the battery stack 10, and may have a predetermined elasticity to prevent the battery cell 110 from being damaged. Thereby, the surface contact between the battery stack 10 and the cooling plate 220 is increased, such that the cooling efficiency of the battery module 1 according to the embodiment of the present invention may be increased.

Meanwhile, a thermal conductive member 340 having thermal conductivity and adhesiveness may be filled between the battery stack 10 and the sensing module assembly 310. More preferably, the thermal conductive member 340 is filled in an empty space (void) formed between the upper surface of the battery stack 10 and the surface pressure pad 330.

In this case, the above-described thermal conductive member 340 may be formed of a gap filler or a heat conductive adhesive, and positioning and fixation of the battery stack 10 may be increased when the thermal conductive member 340 is filled between the battery stack 10 and the surface pressure pad 330. In addition, a contact area between the sensing module assembly 310 and the battery stack 10 is increased through the surface pressure pad 330 and the thermal conductive member 340, such that a heat dissipation effect of the heat generated from the upper portion of the battery stack 10 may be increased through the sensing module assembly 310.

Figure 7:
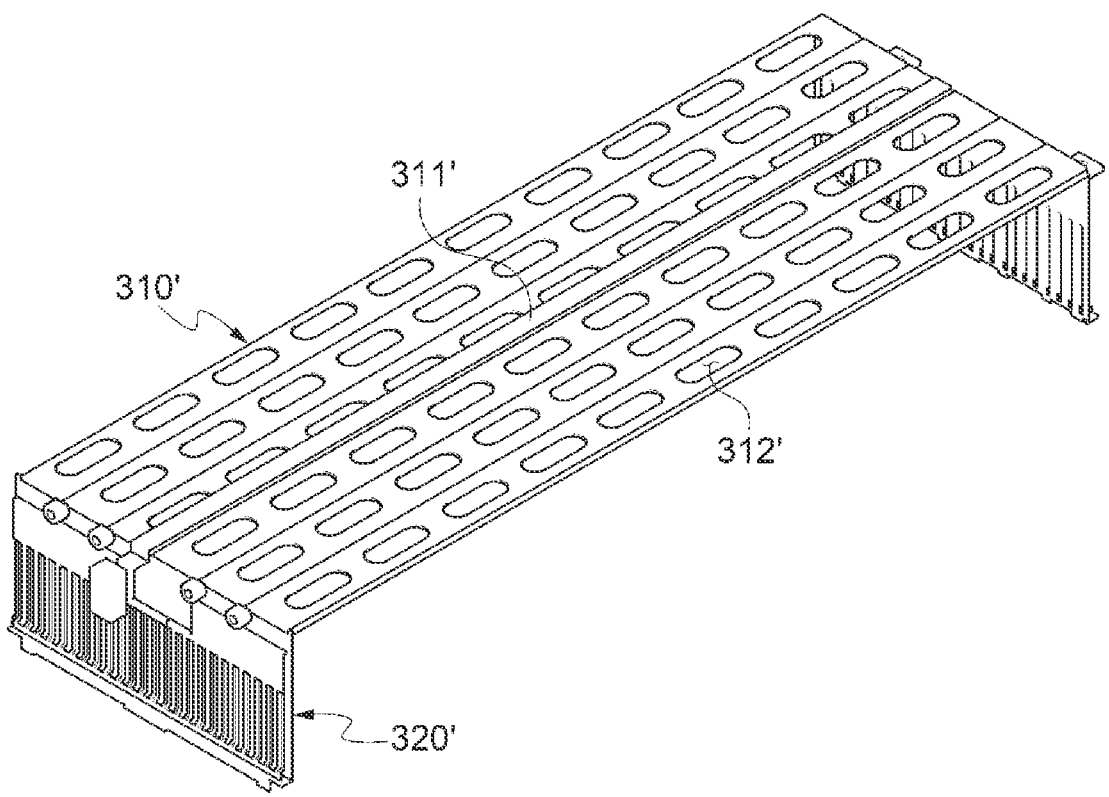
FIG. 7 is a perspective view illustrating an upper structure of a battery module according to another embodiment of the present invention.

FIG. 7 is a perspective view illustrating an upper structure 30' of a battery module 1' according to another embodiment of the present invention.

Referring to FIGS. 1 and 7, the upper structure 30' included in the battery module 1' according to another embodiment of the present invention may include bus bar assemblies 320' and a sensing module assembly 310' which are coupled with each other, and the sensing module assembly may have at least one heat dissipation hole 312' formed therein to dissipate the heat from the battery stack 10'.

Specifically, a plurality of heat dissipation holes 312' may be formed in the sensing module assembly 310' by penetrating in a direction perpendicular to a planar direction of the sensing module assembly 310' (a direction perpendicular to the direction in which the electrode tabs 120 are drawn out and the stacking direction of the battery cells 110), and the plurality of heat dissipation holes 312' may be disposed spaced apart from each other.

Since the plurality of heat dissipation holes 312' are formed in the sensing module assembly 310' in contact with the thermal conductive member 340 and the surface pressure pad 330, the heat dissipation effect through the sensing module assembly 310' of the battery stack 10 may be increased. Meanwhile, the thermal conductive member 340 and the surface pressure pad 330 are located between the sensing module assembly 310' and the upper surface of the battery stack 10, such that an insulation effect may be sufficiently maintained.

Meanwhile, the upper structure 30' may further include a connector 311' for electrically connecting the bus bar assemblies 320' on both sides of the battery stack 10. At this time, the detailed configuration and specific details of the above-described bus bar assembly 320' and the connector 311' are the same as the bus bar assembly 320 and the connector 311 of the battery module 1 according to the above-described embodiment of the present invention, and therefore will not be described in detail herein.

In addition, the remaining configuration except for the above-described sensing module assembly 310' in the battery module 1' according to another embodiment of the present invention is the same as the battery module 1 according to the embodiment of the present invention.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the embodiments, but be defined by the appended claims as well as equivalents thereof.

DESCRIPTION OF REFERENCE NUMERALS 1, 1': Battery module
10: Battery stack
110: Battery cell
111: Electrode assembly
112: Exterior packaging material
1121: Sealing part
120: Electrode tab
20: Case unit
210: Upper case
211: Upper cover
212: Side cover
220: Cooling plate
231: Front cover
232: Rear cover
30, 30': Upper structure
310, 310': Sensing module assembly
310a: Planar portion
310b: Protrusion
311, 311': Connector
311a: First connection member
311b: Second connection member
311c: External connection member
312': Heat dissipation hole
320, 320': Bus bar assembly
321: Bus bar support
322: Bus bar
3221: Bus bar hole
323: Bus bar cover
330: Surface pressure pad
340: Thermal conductive member

What is claimed is:
1. A battery module comprising:
a battery stack formed by stacking a plurality of battery cells respectively including electrode tabs on each other;
bus bar assemblies located on front and rear sides of the battery stack, from which the electrode tabs are drawn, to electrically connect the plurality of battery cells to each other; and
a sensing module assembly connecting the bus bar assemblies, the sensing module assembly having at least one heat dissipation hole formed therein,
wherein the sensing module includes a planar portion disposed on an upper side of the battery stack,
wherein each of the bus bar assemblies includes:
a bus bar support coupled to the planar portion of the sensing module assembly; and
at least one bus bar fixed to the bus bar support, the at least one bus bar electrically connecting the plurality of battery cells to each other.
2. The battery module according to claim 1, wherein the sensing module assembly is formed in a plate or frame form.
3. The battery module according to claim 2, wherein the sensing module assembly is formed in a film shape having a predetermined thickness.
4. The battery module according to claim 3, wherein the sensing module assembly is formed in a thickness of 0.5 mm or less.
5. The battery module according to claim 1, wherein the sensing module assembly is made of an elastic flexible material.
6. The battery module according to claim 1, wherein the sensing module assembly is made of an insulation material.
7. The battery module according to claim 1, wherein the sensing module assembly is made of a material having a melting point of 90° C. or higher.
8. The battery module according to claim 1, wherein the at least one heat dissipation hole has a shape of elongated circle.
9. The battery module according to claim 1, further comprising a surface pressure pad disposed between the battery stack and the sensing module assembly to support the battery stack downward by the sensing module assembly.
10. The battery module according to claim 1, wherein a thermal conductive member is filled between the battery stack and the sensing module assembly.

11. The battery module according to claim 1, wherein the bus bar assemblies and the sensing module assembly are integrally formed with each other.

12. The battery module according to claim 1,
wherein the planar portion connects the bus bar assemblies.

13. The battery module according to claim 12, wherein the at least one heat dissipation hole is formed in the planar portion.

14. The battery module according to claim 12, wherein the sensing module assembly further includes at least one protrusion formed on the planar portion, the at least one protrusion protruding toward the battery stack from the planar portion.

15. The battery module according to claim 1, wherein the bus bar support is positioned between the at least one bus bar and the battery stack.

16. The battery module according to claim 12, wherein the sensing module assembly includes a connector on an upper side of the planar portion, the connector electrically connecting the bus bar assemblies electrically.

* * * * *